United States Patent

Waaben

[15] 3,636,555

[45] Jan. 18, 1972

[54] ANALOG TO DIGITAL CONVERTER UTILIZING PLURAL QUANTIZING CIRCUITS

[72] Inventor: Sigurd Gunther Waaben, Princeton, N.J.

[73] Assignee: Bell Telephone Laboratories, Incorporated, Murray Hill, N.J.

[22] Filed: Mar. 4, 1970

[21] Appl. No.: 16,417

[52] U.S. Cl. ....................340/347 AD
[51] Int. Cl. ....................H03k 13/175
[58] Field of Search ....................340/347

[56] References Cited

UNITED STATES PATENTS 3,241,135 3/1966 Kuflik et al. ....................340/347
2,974,315 3/1961 Lebel et al. ....................340/347
3,343,155 9/1967 Pahlavan ....................340/347 X

*Primary Examiner*—Daryl W. Cook
*Assistant Examiner*—Charles D. Miller
*Attorney*—R. J. Guenther and E. W. Adams, Jr.

[57] ABSTRACT

A plurality of circuits which provide both sampling and comparison functions periodically sample an analog signal and compare the sample with an associated reference voltage. Since the sampling and comparison operations are performed by a single circuit, both operations are performed within the duration of a single energizing timing pulse. In response to these comparisons, the outputs of a plurality of gating means indicate the quantizing range within which the analog sample occurs and energize a read-only memory which stores digital output words corresponding to the quantizing ranges. In a preferred embodiment, two such encoders are used in conjunction with a switchable operational amplifier to obtain coarse and fine encoding.

1 Claims, 3 Drawing Figures

INVENTOR
S. G. WAABEN
BY David P. Kelley
ATTORNEY

ANALOG TO DIGITAL CONVERTER UTILIZING PLURAL QUANTIZING CIRCUITS

BACKGROUND OF THE INVENTION

This invention relates to systems which utilize both analog-type signals. In particular, it relates to parallel analog to digital signal converters.

At least three basic processes are inherent to nearly all analog to digital converters. In a typical analog to digital converter, therefore, at least three basic functional blocks usually can be found. The first of these performs a sampling operation on the analog signal in order to put the analog signal in a convertible form. The second basic functional block compares the analog samples with a reference level or a combination of reference levels. The third basic block is one of code assignment or digitalization in response to the results of the comparisons with the reference levels. These basic functions may be found in most sequential converters, which produce one output digit at a time, as well as most parallel converters, which produce all output digits simultaneously.

Traditionally, an important goal of converter design has been structural simplicity. This goal has resulted chiefly from economic considerations, and usually has been attained with some sacrifice to converting accuracy. For example, sequential converters have been used more often than parallel converters, chiefly because of their structural simplicity. The effect of the advent of an integrated circuitry, however, has been to override the importance of structural simplicity and instead to place the emphasis on functional simplicity, with resulting gains in conversion speed and accuracy. Thus, parallel converters with rather considerable structural complexity have recently found favor for their superior functional simplicity.

Several approaches to analog to digital conversion may be found in the prior art. The first of these seeks periodically to measure only the relative change of an analog signal, rather than its absolute magnitude. An example of this type of approach is delta modulation. Another approach has been for the designer to choose a basic reference unit, and to test how many of these reference units, in combination, make a best match to the analog sample to be converted. Linear pulse code modulation (PCM) converters are examples of this approach. Still another approach has featured several precounted large and small reference units which are combined in sets to obtain the best combinational match. Companded PCM converters serve as examples for this third approach. These approaches often utilize the sequential mode of conversion, usually requiring discrete sample and hold units, and are, therefore, usually limited in attainable conversion speeds.

The present invention is an analog to digital conversion unit which has stored, before conversion, all possible digitalization results. In combination with this storage apparatus is other apparatus for pointing directly to the result which is the best match to the analog signal. The analog to digital converters which embody the principles of the present invention are designed to operate in the parallel mode. In addition, the analog sample and hold units of the prior art converters are eliminated by combining the sampling and comparison operations in a single comparison and hold unit, thereby obtaining further functional simplicity. Thus, converters embodying the principles of the present invention are able to obtain high conversion speeds with substantial conversion accuracy. Furthermore, two such conversion units may be used together in a coarse-and-fine coding arrangement.

In an illustrative embodiment of the invention, each of a plurality of comparison and hold circuits samples the analog signal during a first portion of the timing period and each compares the sample with a different reference voltage during a subsequent portion of the timing period. In response to these comparisons, a plurality of gates operates a read only memory on a "one-hot-out-of-many" basis, and the digital output words are emitted therefrom. In other words, the gating configuration determines the two reference voltages between which the analog sample occurs and then calls the corresponding binary word from a read only memory. In particular, the comparison and hold circuits which are used are of the class described in U.S. Pat. No. 3,480,800 of D. J. Lynes et al.

It is a feature of the present invention that comparison and hold means are used in conjunction with a configuration of gating means to obtain a parallel analog to digital signal converter which is notable for its high conversion speeds and improved encoding accuracy. The type of comparison and hold means which is utilized enables the converters to obtain further improvement in converting speed. It is yet another feature of the present invention that the digitalization of the analog sample and the allocation of binary codes are separated, which results in improved versatility of operation with no penalties to speed or accuracy. Still another feature of the present invention is its automatic range adjustment to the analog signal amplitude.

These and other features of the present invention will become more clear when considered in conjunction with the following detailed description.

DETAILED DESCRIPTION

Figures 1A, 2:
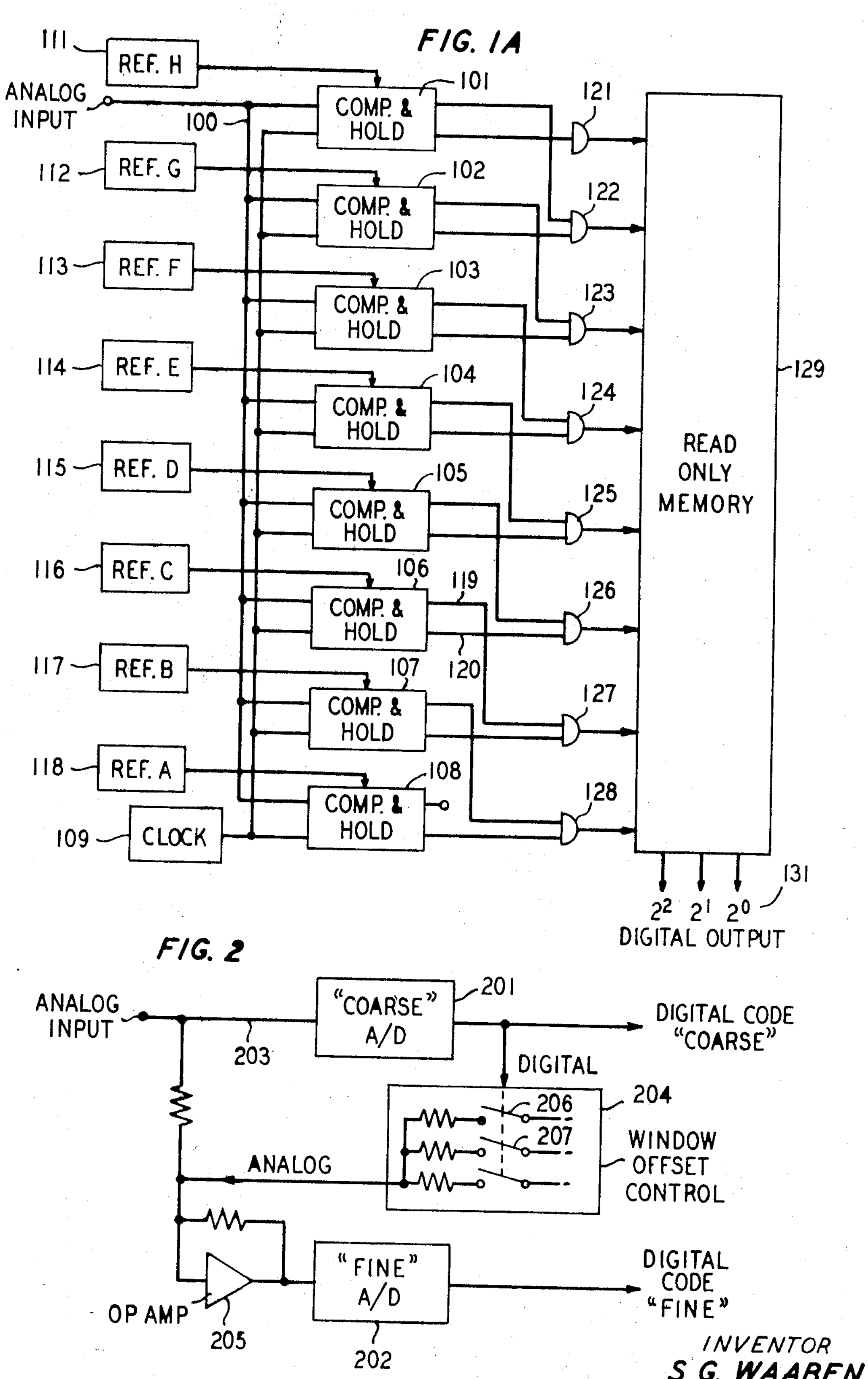
FIG. 1A is a block diagram of an analog to digital conversion unit which embodies the principles of the present invention.
FIG. 2 is a block diagram of a two level coarse-and-fine analog to digital converter which utilizes the principles of the present invention.

An illustrative embodiment of an analog to digital conversion unit which embodies the principles of the present invention is shown in block diagrammatic form in FIG. 1A. The analog input signal is placed onto an analog input bus 100 which transmits it to a plurality of comparison and hold circuits 101 through 108. Each of these comparison and hold circuits, under the control of timing pulses from a clock 109, samples the analog input voltage, and at a time subsequent to the sampling, each compares the analog sample with a different reference voltage. The reference voltages may be obtained from a plurality of reference voltage sources 111 through 118 (or some other convenient arrangement), and each reference voltage source corresponds to a quantization level for the encoding process.

The comparison and hold circuits may be embodied by networks of the class described in U.S. Pat. No. 3,480,800 of D. J. Lynes et al. As such, they have a high-low dual output similar to that of flip-flops; that is, when one is high, or "1," the other is low, or "0." The state of these two outputs may be used therefore to designate whether the particular reference voltage is greater than or less than the analog sample. For example, comparison and hold circuit 106 has output terminals 119 and 120. If terminal 119 is high and terminal 120 is low, this may designate that reference voltage C is greater than the analog sample. If terminal 120 is high and terminal 119 is low, the opposite would be true. Using comparison and hold circuits of the aforementioned Lynes et al. class, conversion speeds in the 2- to 3-nanosecond range have been attained thus far.

The output terminals of comparison and hold circuits 101 through 108 are connected to a plurality of gates 121 through 128, as shown. The gates are shown embodied as AND gates, but dualized configurations of OR, NOR, or NAND gates are equally applicable. The gates 121 through 128 operate a read only memory 129, which transmits digital signals at its output 131.

Figure 1B:
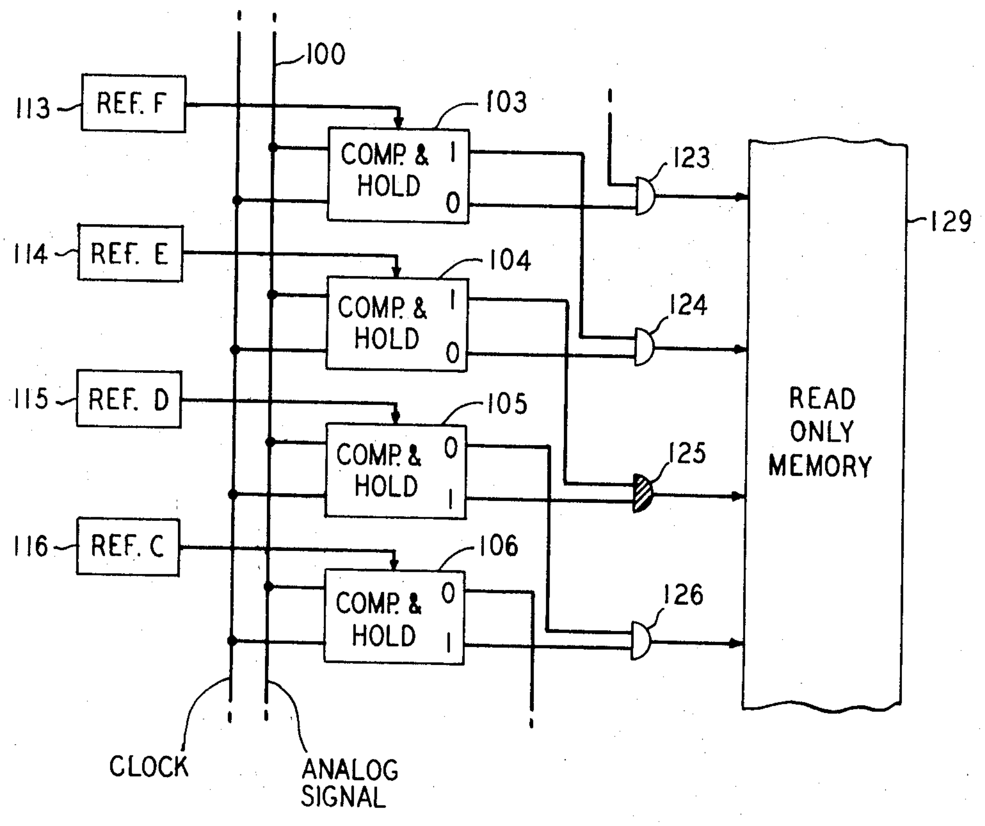
FIG. 1B is a block diagram of a portion of the embodiment of FIG. 1A.
Figure 1B:
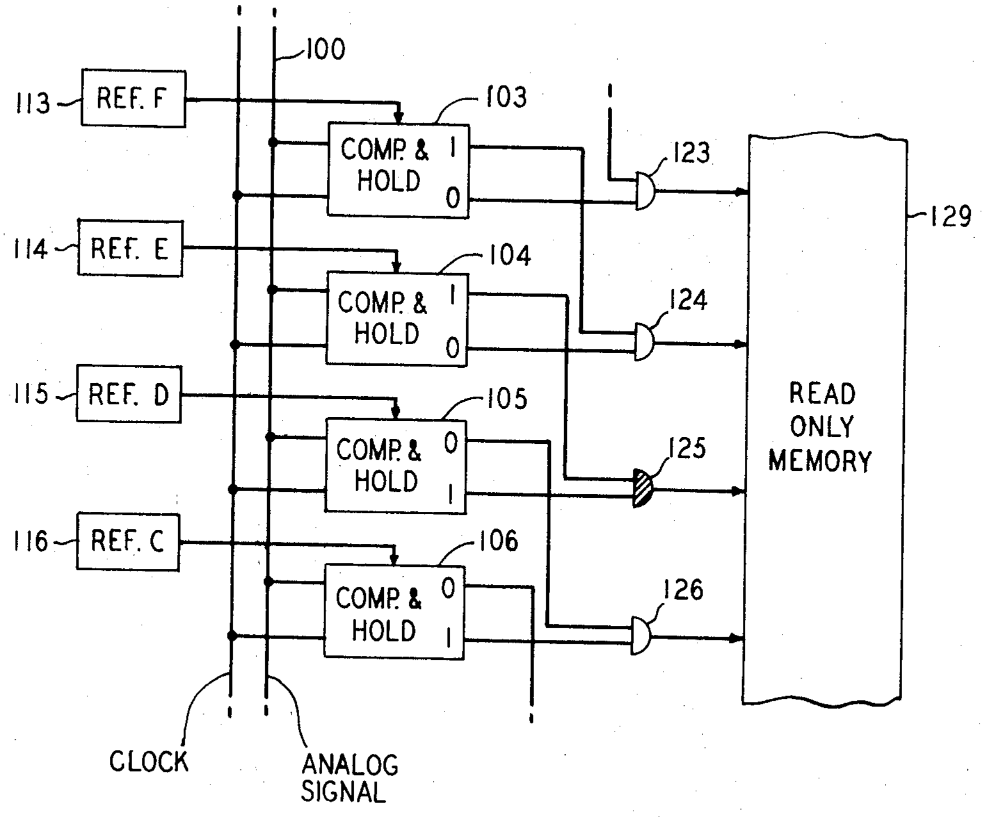

The operation of the embodiment of FIG. 1A may be better understood by considering it in conjunction with the embodiment shown in FIG. 1B, which represents a portion of that of FIG. 1A. The AND-gates 121 through 128 of FIGS. 1A and 1B operate on a "one-hot-out-of-many" basis. In other words, they are so arranged that one and only one of them can be enabled during a given timing period. This enabling occurs whenever both input voltages to a particular gate from its associated comparison and hold output terminals are high, or "1." This arrangement enables the analog to digital converter to find the two reference voltages between which the analog sample occurs.

It is appropriate to consider the operation of this converter over an entire coding sequence. For purposes of the example, the magnitude of the analog sample is assumed to be between the voltages of reference voltage sources 114 and 115. A standard binary coded decimal (BCD) code is also assumed, with reference voltage sources 111 through 118 arranged in decreasing order to correspond to the BCD code. It is apparent that the invention is amenable to virtually any code assignment.

Initially, the analog signal is transmitted by means of the analog input bus 100 to each of the comparison and hold circuits 101 through 108. During the first portion of a timing period, each of the comparison and hold circuits 101 through 108 samples the analog signal. In the second portion of the timing period, each comparison and hold circuit compares the analog sample voltage with the associated reference voltage, and the output terminals of each comparison and hold circuit are accordingly set. For purposes of the example, "1" at an upper terminal in the diagram and a "0" at a lower terminal shall designate that the reference voltage is larger than the analog sampled voltage. Thus, a "0" at an upper terminal and a "1" at a lower terminal shall designate that the analog sample voltage is larger than the reference voltage. For the analog sample in question, which is larger than the voltage of reference voltage source 115, but smaller than the voltage of reference voltage source 114, the output terminals of the comparison and hold circuits are set as shown in FIG. 1B. Thus, comparison and hold circuits 101 through 104, inclusive, are set with the upper terminal at "1" and the lower terminal at "0." Comparison and hold circuits 105 through 108, however, are set with the upper terminal at "0" and the lower terminal at "1." Consequently, AND-gate 125 is the only gate which is to be enabled, since it is the only one which has "1's" at both input terminals. The read only memory 129 is thereby signalled only by gate 125 and the digital output word for the converted analog sample is the one which corresponds to the quantization range between reference voltage D 115 and reference voltage E 114. For the BCD code, the digital output word would be 011; other code choices would yield different output words. A new timing period is then begun, and the comparison and hold circuits 101 through 108 once more sample the analog signal and repeat the conversion process.

The foregoing embodiments of the invention operated for an eight-level quantizing process (three-digit output). However, the principles of the present invention may be readily expanded to any number of quantizing levels. It is also notable that the processes of digitalization (i.e., quantization) and code allocation (i.e., storage of output words) are separated. Thus, analog to digital converters embodying the principles of the present invention have great flexibility with respect to both attributes; they allow for wide choice of codes and of quantization characteristics. Furthermore, the type of comparison and hold circuits chosen are notably high-speed circuits, and the analog to digital converters which utilize the principles of the present invention therefore operate at high conversion speeds.

The embodiments shown in FIGS. 1A and 1B were for a basic analog to digital conversion unit. The scope of operation of converters which utilize the principles of the present invention may be greatly expanded by combining two such units in a coarse-and-fine analog to digital converter. One embodiment of such a coarse-and-fine two-level analog to digital converter is shown in block diagrammatic form in FIG. 2.

In FIG. 2 a first analog to digital conversion unit 201 is designated the "coarse" converter, and a second conversion unit 202 is designated the "fine" converter. It can be appreciated from the foregoing discussion that the described analog to digital conversion units require the analog input signal to be in a certain amplitude range: the approximate range of the reference voltages. This input range may be designated as an "input window."

The operation of the embodiment of FIG. 2 proceeds as follows. The analog input voltage is initially transmitted to the coarse converter 201 by means of an analog input bus 203. The coarse converter 201 then proceeds to sample and convert this signal to digital information, designated as coarse digital output, in a manner similar to that described in connection with FIGS. 1A and 1B. This digital information is transmitted as digital output, and is also transmitted to a window offset control 204. The window offset control 204 is utilized to control the offset of an operational amplifier 205 by changing its input circuit. One simple way of accomplishing this is the operation of switches 206, 207, etc., which changes the resistance of the input circuit of operational amplifier 205. The purpose of the offset change is to enable the analog signal to be placed in the input window of the "fine" converter 202. When this is accomplished, the fine converter 202 further quantizes the segment of the amplitude range indicated by the coarse converter and converts it to digital information, designated as a fine output code. The fine output code is then transmitted along with the previously generated coarse output code.

It is to be understood that the above-described arrangements are illustrative of the application of the principles of the invention. Numerous other arrangements may be devised by those skilled in the art without departing from the spirit and scope of the invention.

What is claimed is:

1. In a system which utilizes an analog-type signal and a digital-type signal at different points therein, analog to digital conversion apparatus comprising:
 a source of timing pulses for controlling the rate of operation of said conversion apparatus;
 a first plurality of reference voltage sources for producing voltages separated by increments designated as coarse quantizing ranges;
 a first plurality of comparison and hold means each being associated with a different one of said first plurality of reference voltage sources;
 means for coupling said analog type signal to each of said first plurality of comparison and hold means, each of said first plurality of comparison and hold means comparing once during each period of said source of timing pulses the amplitude of the analog-type signal with the amplitude of the associated one of said first plurality of reference voltage sources, each of said first comparison and hold means having a bistable output, the state of the bistable output being determined by the relative amplitude of the analog-type signal with respect to the associated reference voltage source;
 a first plurality of gating means responsive to said first plurality of comparison and hold means for selecting the coarse quantizing range in which the analog signal voltage occurs, each of said first plurality of gating means being associated with two of said first plurality of comparison and hold means and each gating means corresponding to a different coarse quantizing range;
 first memory means responsive to said first plurality of gating means for emitting once during each period of said source of timing pulses a coarse digital word indicative of the coarse quantizing range corresponding to the one of said first plurality of gating means activated during the same timing period;
 an operational amplifier circuit having an input circuit connected to receive said analog-type signal, said input circuit including a plurality of resistors switchable into and